United States Patent
Yang

(10) Patent No.: US 8,842,381 B2
(45) Date of Patent: Sep. 23, 2014

(54) MICRO-LENS MODULE

(75) Inventor: Chuan-Hui Yang, Tainan (TW)

(73) Assignee: Himax Technologies Limited, Tainan (TW)

( * ) Notice: Subject to any disclaimer, the term of this patent is extended or adjusted under 35 U.S.C. 154(b) by 112 days.

(21) Appl. No.: 13/440,119

(22) Filed: Apr. 5, 2012

(65) Prior Publication Data

US 2013/0265654 A1  Oct. 10, 2013

(51) Int. Cl.
*G02B 9/04* (2006.01)
*G02B 3/02* (2006.01)
*G02B 13/00* (2006.01)

(52) U.S. Cl.
CPC .................. *G02B 13/003* (2013.01)
USPC ........................ 359/793; 359/717; 359/795

(58) Field of Classification Search
USPC .......................... 359/717, 793, 795
See application file for complete search history.

(56) References Cited

U.S. PATENT DOCUMENTS 8,373,937 B2 * 2/2013 Hsieh et al. .................. 359/717
2008/0100910 A1 5/2008 Kim et al.

FOREIGN PATENT DOCUMENTS

JP 2008-233884 10/2008

OTHER PUBLICATIONS

"Office Action of Taiwan Counterpart Application", issued on Apr. 7, 2014, p. 1-p. 4.

* cited by examiner

*Primary Examiner* — Jack Dinh
(74) *Attorney, Agent, or Firm* — J.C. Patents

(57) ABSTRACT

A micro-lens module including a first lens group and a second lens group is provided. The first lens group disposed between an object side and an image side has a first aspheric surface which is the surface closest to the object side and a second aspheric surface which is the surface closest to the image side. The second lens group disposed between the first lens group and the image side has a third aspheric surface which is the surface closest to the first lens group and a fourth aspheric surface which is the surface closest to the image side. An overall length of the micro-lens module is L, an effective focal length (EFL) of the micro-lens module is f, and an EFL of the second lens group is f2. The micro-lens module satisfies following conditions: $1.5 > L/f > 0.6$, and $-7 > f2/f > -14$.

16 Claims, 7 Drawing Sheets

MICRO-LENS MODULE

BACKGROUND OF THE INVENTION

1. Field of the Invention

The invention relates to a lens module, and more particularly to a micro-lens module.

2. Description of Related Art

Along with progress of technology, various portable electronic products such as mobile phones, personal digital assistants (PDAs), notebook computers, tablet computers, etc. are generally equipped with a micro camera lens to facilitate users taking pictures in daily life. Thanks to the continuous improvement in performance and the declining in price, the camera function has become a basic function of the portable electronic products.

Generally speaking, a micro-lens module for photographing is required to provide a high imaging quality and a miniaturized size to satisfy the market demand. The current micro-lens module in the market has different structure designs in accordance with the requirement of pixel number. For example, the current micro-lens module usually includes one to five optical elements and has different structure designs. On the other hand, different manufacturing methods conducted on the lens also result in different structure designs. According to the manufacturing methods, the type of the lens can usually be categorized into an aspheric lens, a spherical glass lens, an aspheric glass lens, and a complex lens. The micro-lens module having the foregoing categorized lenses usually includes independent aperture stops and infrared rays cut (IR-CUT) films based on the structure design of the optical elements. Independent aperture stops are also applied for eliminating the stray light caused by the various optical components.

However, a better micro-lens module including complex optical elements suitable for more than one million pixels application with a good imaging quality and a miniaturized size is still looking for further development.

SUMMARY OF THE INVENTION

The invention is directed to a micro-lens module capable of providing a good imaging quality and having a miniaturized size.

An exemplary embodiment of the invention provides a micro-lens module including a first lens group and a second lens group. The first lens group disposed between an object side and an image side has a first aspheric surface which is the surface closest to the object side and a second aspheric surface which is the surface closest to the image side. The second lens group disposed between the first lens group and the image side has a third aspheric surface which is the surface closest to the first lens group and a fourth aspheric surface which is the surface closest to the image side. An overall length of the micro-lens module is L, an effective focal length (EFL) of the micro-lens module is f and an EFL of the second lens group is f2. The micro-lens module satisfies following conditions: $1.5 > L/f > 0.6$, and $-7 > f2/f > -14$.

According to an exemplary embodiment of the invention, a distance between the first aspheric surface and the second aspheric surface is L1, and a distance between the third aspheric surface and the fourth aspheric surface is L2. The micro-lens module satisfies $1.3 > L1/L2 > 0.8$.

According to an exemplary embodiment of the invention, the image processing device is disposed at the image side. A distance between the second aspheric surface and the third aspheric surface is T1, and a distance between the fourth aspheric surface and a surface of the image processing device is BFL. The micro-lens module satisfies $0.7 > T1/BFL > 0.4$.

According to an exemplary embodiment of the invention, a radius of curvature of the first aspheric surface is r1, a radius of curvature of the second aspheric surface is r2, a radius of curvature of the third aspheric surface is r3, a radius of curvature of the fourth aspheric surface is r4. The micro-lens module satisfies following conditions: $r1 > 0$, $r2 > 0$, $r3 > 0$, and $r4 > 0$.

According to an exemplary embodiment of the invention, the first lens group includes a first lens and a second lens arranged in sequence from the object side to the image side. The first lens is closest to the object side in the first lens group, and a surface of the first lens facing the object side is the first aspheric surface. The second lens is closest to the second lens group in the first lens group, and a surface of the second lens facing the image side is the second aspheric surface.

According to an exemplary embodiment of the invention, reflective indexes of the first lens and the second lens are respectively n1 and n2. The first lens satisfies $1.61 > n1 > 1.56$, and the second lens satisfies $1.55 > n2 > 1.5$.

According to an exemplary embodiment of the invention, the first lens group further includes a first transparent flat lens, an aperture stop and an infrared filter. The aperture stop is disposed on a surface of the first transparent flat lens facing the object side, and the infrared filter is disposed on a surface of the first transparent flat lens.

According to an exemplary embodiment of the invention, the first lens includes a lens portion and a carry portion integrally formed, where a surface of the carry portion of the first lens facing the object side is a matte surface.

According to an exemplary embodiment of the invention, the second lens includes a lens portion and a carry portion integrally formed, where a surface of the carry portion of the second lens facing the image side is a matte surface.

According to an exemplary embodiment of the invention, the second lens group includes a third lens and a fourth lens arranged in sequence from the first lens group side to the image side. The third lens is closest to the first lens group in the second lens group, and a surface of the third lens facing the first lens group is the third aspheric surface. The fourth lens is closest to the image side in the second lens group, and a surface of the fourth lens facing the image side is the fourth aspheric surface.

According to an exemplary embodiment of the invention, reflective indexes of the third lens and the fourth lens are respectively n3 and n4. The third lens satisfies $1.55 > n3 > 1.5$, and the fourth lens satisfies $1.61 > n4 > 1.56$.

According to an exemplary embodiment of the invention, the second lens group further includes a second transparent flat lens.

According to an exemplary embodiment of the invention, the third lens includes a lens portion and a carry portion integrally formed, where a surface of the carry portion of the third lens facing the object side is a matte surface.

According to an exemplary embodiment of the invention, the fourth lens includes a lens portion and a carry portion integrally formed, where a surface of the carry portion of the fourth lens facing the image side is a matte surface.

Based on the above description, according to the exemplary embodiments of the invention, the first lens group includes the aperture stop and the infrared filter which are optionally disposed on the surfaces of the transparent flat lens to form a complex optical element. Therefore, the micro-lens module including complex optical elements with good imaging quality has been miniaturized. Furthermore, the lenses of the micro-lens module each have a lens portion and a carry portion, and the surface of the carry portion is designed as a matte surface to reduce stray light.

In order to make the aforementioned and other features and advantages of the invention more comprehensible, embodiments accompanying figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1A:
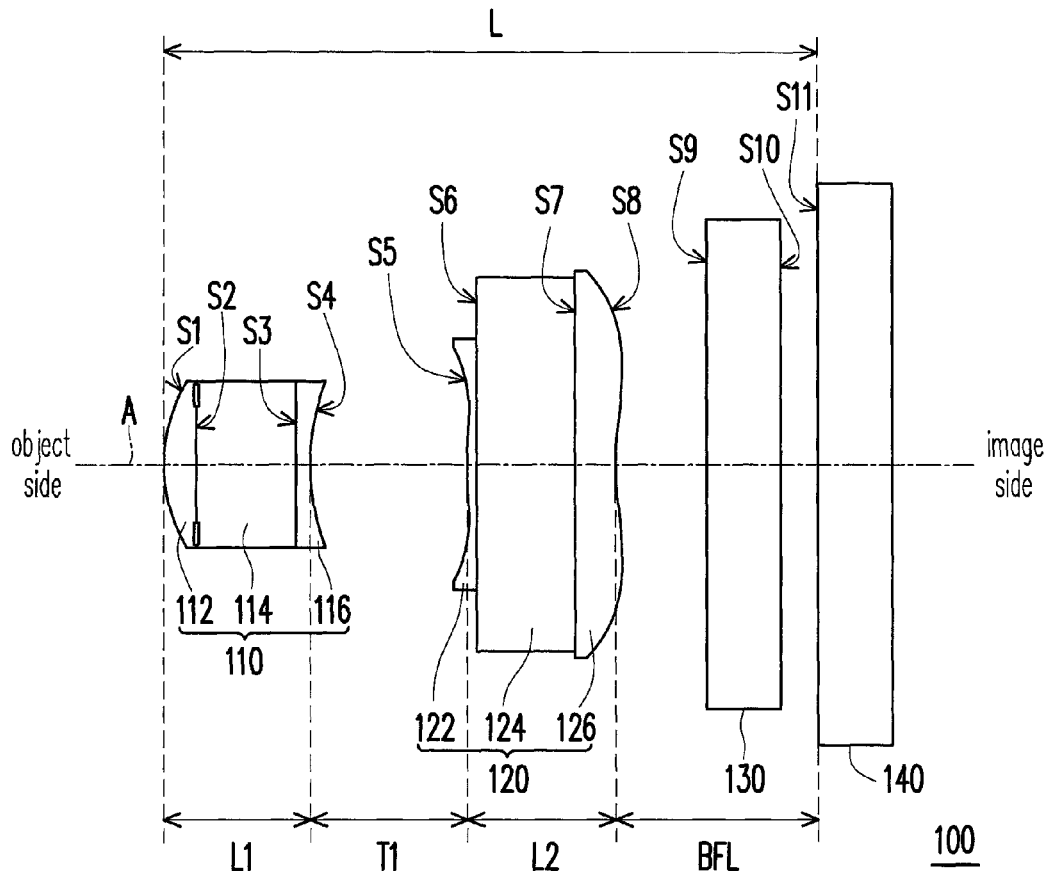
FIG. 1A is a schematic structural diagram of a micro-lens module according to an embodiment of the invention.

FIG. 1A is a schematic structural diagram of a micro-lens module according to an embodiment of the invention. Referring to FIG. 1A, in the present embodiment, the micro-lens module 100 adapted for an image processing device 140 includes a first lens group 110 and a second lens group 120 disposed along optical axis A. The first lens group 110 is disposed between an object side and an image side. A surface S1 closest to the object side in the first lens group 110 is a first aspheric surface, and a surface S4 closest to the image side in the first lens group 110 is a second aspheric surface. The second lens group 120 is disposed between the first lens group 110 and the image side. A surface S5 closest to the first lens group 110 in the second lens group 120 is a third aspheric surface, and a surface S8 closest to the image side in the second lens group 120 is a fourth aspheric surface. An overall length of the micro-lens module is L, an effective focal length (EFL) of the micro-lens module is f, an EFL of the second lens group is f2. In order to make sure optical image quality, the micro-lens satisfies at least the following conditions: $1.5 > L/f > 0.6$, and $-7 > f2/f > -14$.

Furthermore, in the present embodiment, a distance between the first aspheric surface S1 and the second aspheric surface S4 is L1, and a distance between the third aspheric surface S5 and the fourth aspheric surface S8 is L2. A distance between the second aspheric surface S4 and the third aspheric surface S5 is T1, and a distance between the fourth aspheric surface S8 and a surface Si1 of the image processing device 140 is BFL. The image processing device 140 in the present embodiment is disposed at the image side, and the image process device 140 includes a charge coupled device (CCD), or a complementary metal-oxide-semiconductor (CMOS) sensor, etc. Therefore, the image processing device is also capable for image sensing. To improve the image quality, the micro-lens module further satisfies two conditions: $1.3 > L1/L2 > 0.8$, and $0.7 > T1/BFL > 0.4$.

Besides, in the present embodiment, radius of curvature of the first aspheric surface r1, radius of curvature of the second aspheric surface r2, radius of curvature of the third aspheric surface r3, and radius of curvature of the fourth aspheric surface r4 satisfy the following conditions: $r1 > 0$, $r2 > 0$, $r3 > 0$, and $r4 > 0$.

Referring to FIG. 1A again, the first lens group 110 and the second lens group 120 respectively include a plurality of lenses. To be more specific, the first lens group 110 disposed between the object side and the image side includes a first lens 112, a first transparent flat lens 114 and a second lens 116. The first lens 112, the first transparent flat lens 114 and the second lens 116 are arranged in sequence from the object side to the image side. The first lens 112 is closest to the object side in the first lens group 110, and the surface of the first lens 112 facing to the object side is the first aspheric surface S1. On the other hand, the second lens 116 is closest to the image side in the first lens group 110, and the surface of the second lens 116 facing to the image side is the second aspheric surface S4. The first transparent flat lens 114 is disposed between the first lens 112 and the second lens 116. Therefore, a surface S2 of the first lens 112 faces to the image side and leans against to a plane of the first transparent flat lens 114, and a surface S3 of the second lens 116 faces to the object side and leans against to an opposite plane of the first transparent flat lens 114. For the first lens 112 and the second lens 116, according to an exemplary embodiment, the reflective indexes are respectively n1 and n2. In the present micro-lens module, the first lens satisfies $1.61 > n1 > 1.56$, and the second lens satisfies $1.55 > n2 > 1.5$.

Figure 1B:
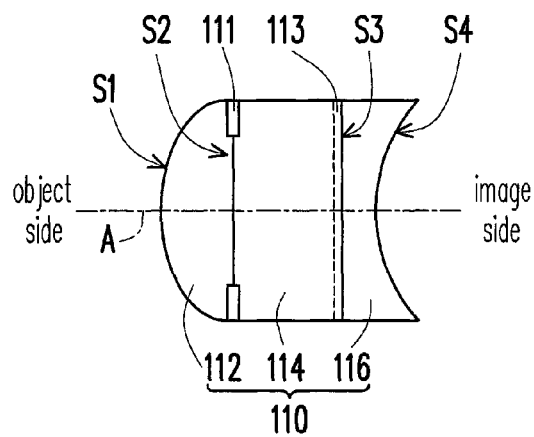
FIG. 1B is a schematic diagram of the first lens group shown in FIG. 1A.

FIG. 1B is a schematic diagram of the first lens group shown in FIG. 1A. Referring to FIG. 1B, the first lens group 110 further includes an aperture stop 111 and an infrared filter 113. The aperture stop 111 and the infrared filter 113 can be disposed selectively on one plane of the first transparent flat lens 114. The aperture stop 111 is adopted for determining the amount of light reaching the image processing device, and the infrared filter 113 is adopted for blocking unwanted infrared light herein. Both of the aperture stop 111 and the infrared filter 113 can be formed on the surfaces of the lenses or on the first transparent flat lens in a manner of coating. In the present exemplary embodiment, the aperture stop 111 is disposed on the plane of the first transparent flat lens 114 facing to the surface S2. The infrared filter 113 is disposed optionally on at least one plane of the first transparent flat lens 114. Herein, the infrared filter 113 disposed on the plane of the first transparent flat lens 114 facing to the surface S3 is exemplary for description. Accordingly, the first lens group 110 is a complex optical element with miniaturized size. In another embodiment, the infrared filter 113 may also be disposed on the plane of the first transparent flat lens 114 facing to the surface S2.

On the other hand, as shown in FIG. 1A, the second lens group 120 including a third lens 122, a second transparent flat lens 124 and a fourth lens 126 is disposed between the first lens group 110 and the image side. The third lens 122, the second transparent flat lens 124 and the fourth lens 126 are arranged in sequence from the side of the first lens group 110 to the image side. The third lens 122 is closest to the object side in the second lens group 120, and the surface of the third lens 122 facing to the object side is the third aspheric surface S5. The fourth lens 126 is closest to the image side in the second lens group 120, and the surface of the fourth lens 126 facing to the image side is the fourth aspheric surface S8. In addition, the second transparent flat lens 124 is disposed between the third lens 122 and the fourth lens 126. Therefore, a surface S6 of the third lens 122 faces to the image side and leans against to a plane of the second transparent flat lens 124 and a surface S7 of the fourth lens 126 faces to the object side and leans against to an opposite plane of the second transparent flat lens 126. For the third lens 122 and the fourth lens 126, according to an exemplary embodiment, the reflective indexes are respectively n3 and n4. In the present micro-lens module, the third lens satisfies 1.55>n2>1.5, and the fourth lens satisfies 1.61>n1>1.56.

Moreover, another aperture stop (not shown) can be optionally disposed in the second lens group 120 for further controlling the amount of light. Referring to FIG. 1A, although the second transparent flat lens 124 and the fourth lens 126 are formed separately, it is possible to form a single lens instead of forming the second transparent flat lens 124 and the fourth lens 126 separately for reducing the number of lenses used in the micro-lens module 100.

In the present exemplary embodiment, the micro-lens module 100 further includes a protection cover 130 disposed between the second lens group 120 and the image processing device 140 for protecting the image processing device 140. The protection cover 130 has two surfaces, where a surface S9 faces to the object side, and another surface S10 faces to the image side and the surface S11 of the image processing device 140. In the present embodiment, a material of the protection cover 130 is a transparent material, for example, glass, or transparent resins, etc.

An embodiment of the micro-lens module 100 is provided below. It should be noticed that data listed in following table 1 and table 2 are not used to limit the invention, and those skilled in the art can suitably change the parameters or settings therein without departing from the scope of the invention.

TABLE 1

| Surface | Radius of Curvature (mm) | Distance (mm) | Index of Refraction | Abbe Number | Notes |
|---|---|---|---|---|---|
| S1 | 0.93 | 0.195 | 1.576 | 31.6 | first lens |
| S2 | infinity | 0.6 | 1.51 | 61.6 | transparent flat lens |
| S3 | infinity | 0.085 | 1.52 | 48.7 | second lens |
| S4 | 1.72 | 0.39 | | | |
| S5 | 4.7 | 0.05 | 1.52 | 48.7 | third lens |
| S6 | infinity | 0.6 | 1.51 | 61.6 | transparent flat lens |
| S7 | infinity | 0.255 | 1.576 | 31.6 | fourth lens |
| S8 | 3.5 | 0.25 | | | |
| S9 | infinity | 0.4 | 1.52 | 64.9 | protection cover |
| S10 | infinity | 0.045 | | | |
| S11 | infinity | | | | image processing device |

In Table 1, the distance refers to a linear distance along the optical axis A between two neighboring surfaces. For example, the distance of surface S3 is the linear distance along the optical axis A between surface S3 and surface S4. The distance, index of refraction, and Abbe number corresponding to each of the lenses listed in the "Notes" column can be found in the corresponding values for the distance, index of refraction, and Abbe number from each row. Moreover, in Table 1, surfaces S1 and S2 are two surfaces of the first lens 112, surfaces S3 and S4 are two surfaces of the second lens 116, surfaces S5 and S6 are two surfaces of the third lens 122, surfaces S7 and S8 are two surfaces of the fourth lens 126, surfaces S9 and S10 are two surfaces of the protection cover 130, and the surface S11 is a surface of the image processing device 140, where a value filled in the distance field in the row of the surface S10 is a distance between the surface S10 and the image processing device 140.

The radius of curvature, the distance, and other parameters are shown in Table 1, so they are not further described herein. Although no limitation is provided for Abbe number within the micro-lens module 100, it should be noted that Abbe number of each lens is chosen in a reasonable manner. Since Abbe numbers are important for designing a lens module, the numbers are also given in Table 1. As shown in Table 1, the design of the micro-lens module 100 fully satisfies the conditions mentioned above.

The above surfaces S1, S4, S5, and S8 are aspheric surfaces with even power, and are expressed by the following formula:

$$Z(r) = \frac{cr^2}{1+\sqrt{1-(1+k)c^2r^2}} + \alpha_1 r^2 + \alpha_2 r^4 + \alpha_3 r^6 + \alpha_4 r^8 + \alpha_5 r^{10} + \alpha_6 r^{12} + \alpha_7 r^{14} + \alpha_8 r^{16}$$

In the formula, $Z(r)$ is a sag of the displacement of the surface from the vertex or the related perpendicular line in the direction of the optical axis A, and c is the inverse of the radius of an osculating sphere, i.e. the inverse of the radius of curvature (e.g., the radius of curvatures of surfaces S1, S4, S5, and S8 in the Table 1) close to the optical axis A. k is a conic coefficient, r is a height of an aspheric surface, i.e. a height from a center to an edge of a lens, and $\alpha_1$-$\alpha_8$ are aspheric coefficients, and in the present embodiment, the coefficient $\alpha_1$ is 0. Other parameters $\alpha_2$-$\alpha_8$ of the surfaces S1, S4, S5 and S8 are listed in a Table 2.

TABLE 2

| Aspheric Surface Parameter | conic constant k | Coefficient $\alpha_2$ | Coefficient $\alpha_3$ | Coefficient $\alpha_4$ |
|---|---|---|---|---|
| S1 | −38 | 4.26 | −40.17 | 261.7 |
| S4 | 3.5 | 0.16 | −3.06 | 48.28 |
| S5 | 0 | −1.2 | 11.3 | −88.98 |
| S8 | 0 | −0.204 | 0.198 | −0.536 |

| Aspheric Surface Parameter | Coefficient $\alpha_5$ | Coefficient $\alpha_6$ | Coefficient $\alpha_7$ | Coefficient $\alpha_8$ |
|---|---|---|---|---|
| S1 | −780 | −883.5 | 11700 | −20970 |
| S4 | −318 | 1114 | −1886 | 1100 |
| S5 | 383.2 | −912.3 | 1119 | −550.2 |
| S8 | 0.673 | −0.45 | 0.147 | −0.018 |

Figure 1C:
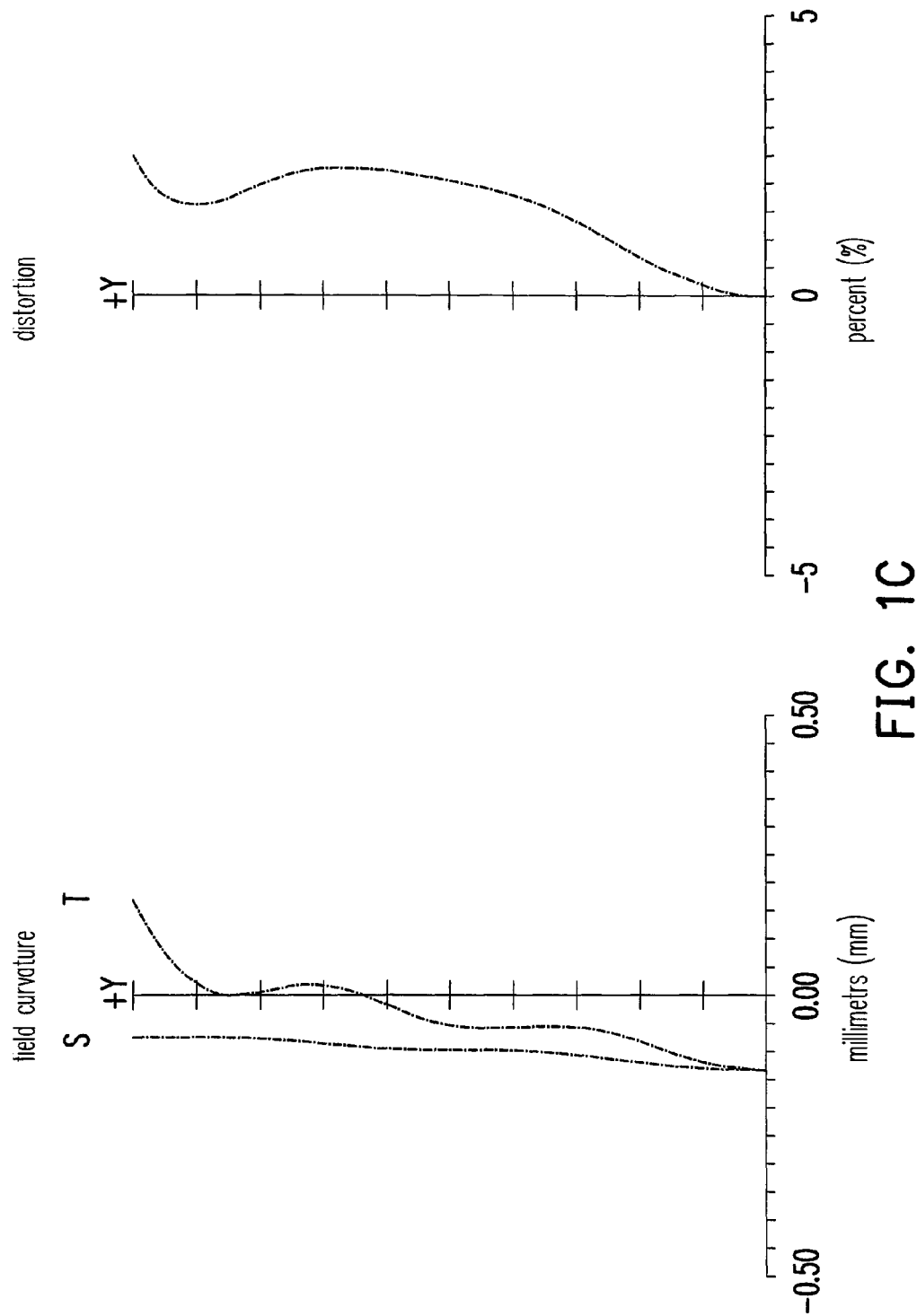
FIG. 1C and FIG. 1D are imaging optical simulation data diagrams of the micro-lens module of FIG. 1A.
Figure 1D:
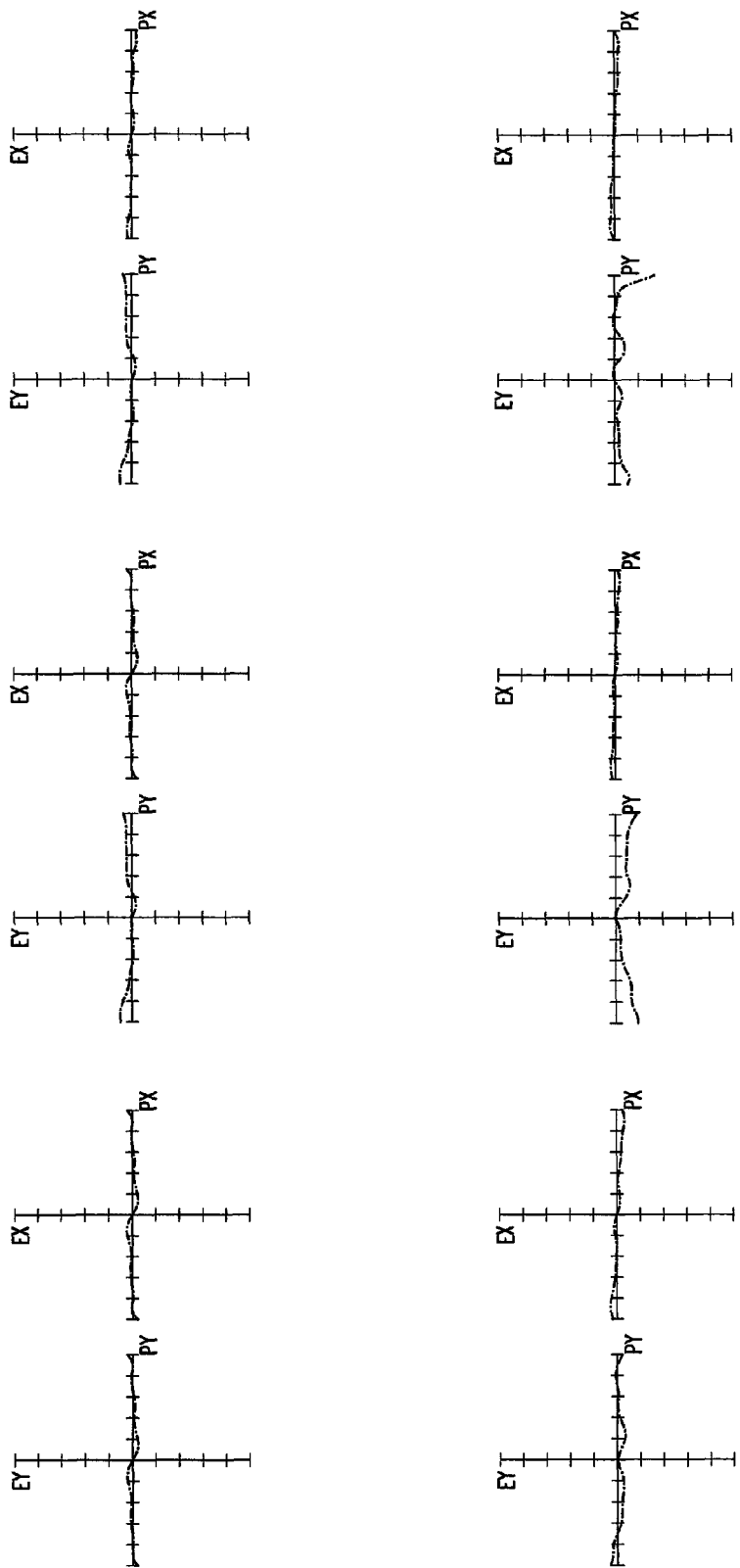

FIG. 1C and FIG. 1D are imaging optical simulation data diagrams of the micro-lens module 100 of FIG. 1A. Referring to FIG. 1C and FIG. 1D, a field curvature diagram and a distortion diagram are respectively illustrated from the left to the right. Moreover, FIG. 1D is a transverse ray fan plot of images. According to FIG. 1C and FIG. 1D, it is known that the micro-lens module 100 of the present embodiment has a good imaging quality while maintaining a miniaturized size.

Figure 2:
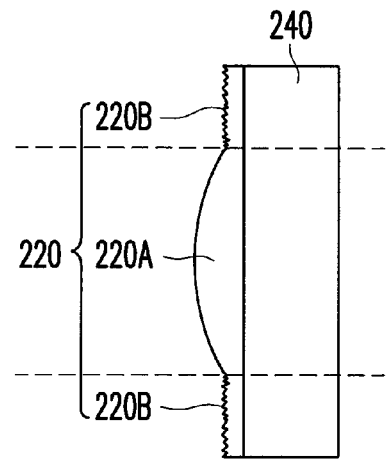
FIG. 2 is a schematic diagram of a lens design according to an embodiment of the invention.

For a good imaging quality, stray light caused by optical components in micro-lens module is another problem. To eliminate the stray light, limiting the light path is an effective method. FIG. 2 is a schematic diagram of a lens design according to an embodiment of the invention. Referring to FIG. 2, a lens 220 leaned against to a transparent flat lens 240 is designed to include a lens portion 220A and a carry potion 220B integrally formed. To eliminate the stray light, except the lens portion 220A which is the light path, a surface of the carry portion 220B is designed as a matte surface. Since a matte surface is available to reflect the diffuse light, the amount of the stray light is thus reduced.

Figure 3:
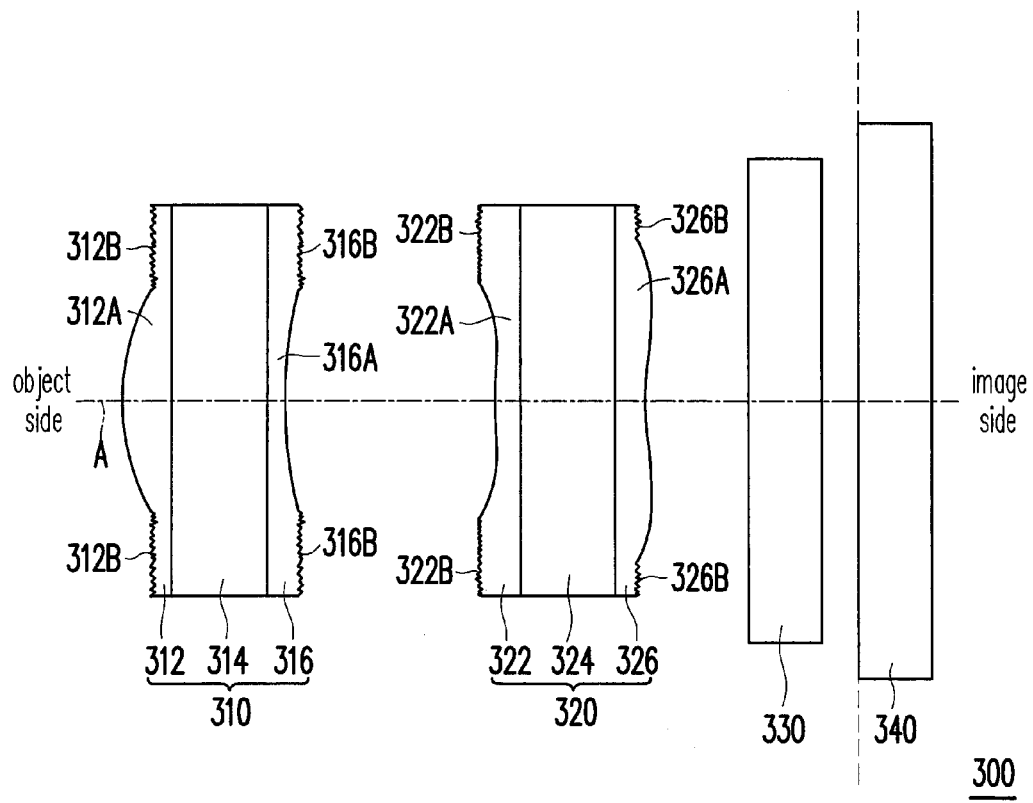
FIG. 3 is a structural schematic diagram of a micro-lens module according to another embodiment of the invention.

FIG. 3 is a structural schematic diagram of a micro-lens module 300 according to another embodiment of the invention. A first lens group 310 is disposed between the object side and the image side and includes a first lens 312, a first transparent flat lens 314, and a second lens 316 arranged in sequence from the object side to the image side. A second lens group 320 is disposed between the first lens group 310 and the image side and includes a third lens 322, a second transparent flat lens 324, and a fourth lens 326 arranged in sequence from the side of the first lens group 310 to the image side. A protection cover 330 disposed between the second lens group 320 and the image side is for protecting an image processing device 340 located between the protection cover 330 and the image side.

According to the present exemplary embodiment, in the micro-lens module 300, the first lens 312, the second lens 316, the third lens 322 and the fourth lens 326 respectively include a lens portion (312A, 316A, 322A and 326A) and a carry portion (312B, 316B, 322B and 326B) integrally formed. A surface of the carry portion 312B of the first lens 312 facing to the object side, a surface of the carry portion 316B of the second lens 316 facing to the image side, a surface of the carry portion 322B of the third lens 322 facing to the object side, and a surface of the carry portion 326B of the fourth lens 326 facing to the image side are designed as matte surfaces. The stray light caused by the various optical components can be eliminated by the matte surfaces of the lenses, so that the stray light problem in the micro-lens module 300 can be effectively rectified. In one exemplary embodiment, the micro-lens module 300 may satisfy with the optical conditions that the micro-lens module 100 satisfies and the data listed in foregoing table 1 and table 2. It should be noticed that the data listed in foregoing table 1 and table 2 are not used to limit the invention, and those skilled in the art can suitably change the parameters or settings therein without departing from the scope of the invention.

Figure 4A:
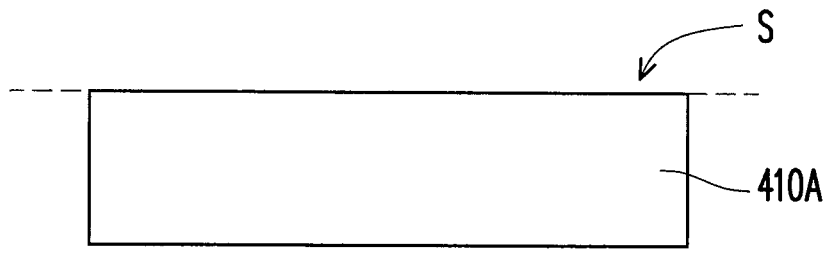
FIG. 4A to FIG. 4F illustrate the process of fabricating the matte surface on the lens by a molding process described in an embodiment of the invention.
Figure 4B:
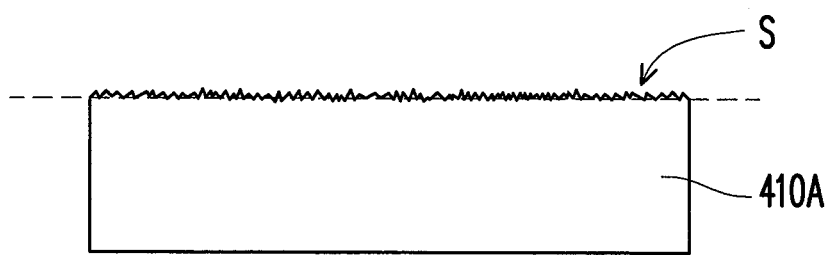
Figure 4C:
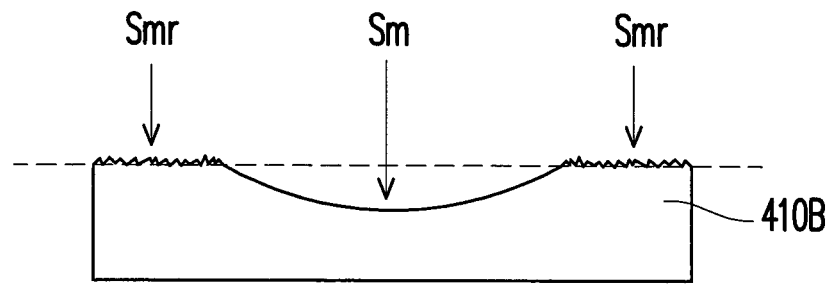
Figure 4D:
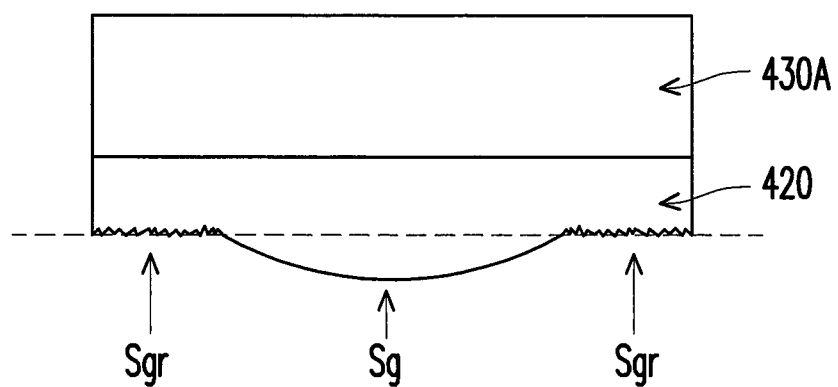

FIG. 4A to FIG. 4F illustrate the process of fabricating the matte surface on the lens by a molding process according to an embodiment of the invention. The molding process is provided below. Referring to FIG. 4A, a metal 410A with a flat and smooth surface S is provided. Next, a sandblasting process is applied on the flat and smooth surface to etch the surface as shown in FIG. 4B. Thus, the surface S is rough and no longer smooth. Thereafter, referring to FIG. 4C, a portion of the metal is removed to form a metal mold 410B with desired shape. Therefore, a newly formed surface Sm, according to the present embodiment, is aspheric and mirror-like surface. However, the rest of the surface S, i.e. the metal surface Smr, is still rough.

Figure 4E:
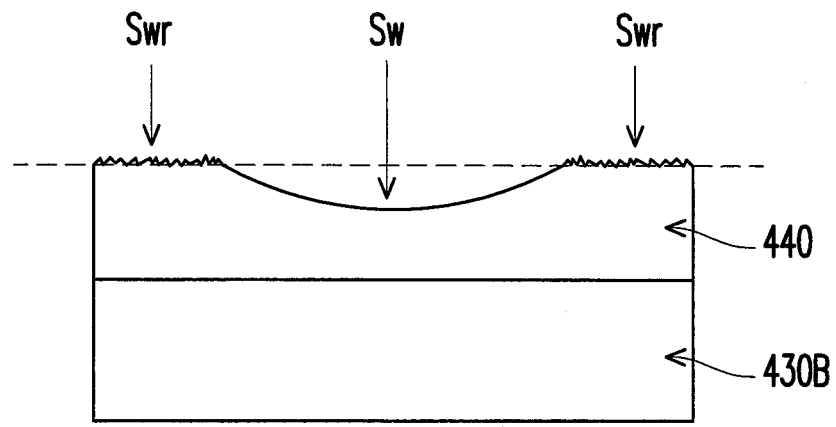

In order to extend the total usage time of the metal mold, a plastic mold is molded to has the shape as same as the shape of the metal mold. Instead of directly using the metal mold, the plastic mold is thus applied for mass production of the lenses. According to FIG. 4D, the metal mold 410B is applied to mold a plastic sub-mold 420 disposed on a glass plate 430A. Since a surface Sg is shaped by the surface Sm, the surface Sg is also aspheric and mirror-like. On the other hand, the rest of the surface of the plastic sub-mold 420, i.e. the surface Sgr, shaped by the rough surface Smr is also rough. Referring to FIG. 4E, a plastic working mold 440 disposed on a glass plate 430B is then generated by applying the sub-mold 420. A surface Sw shaped by the surface Sg is aspheric and mirror-like, and the rest of the surface of the plastic working mold 440, i.e. the surface Swr, shaped by the rough surface Sgr is rough. Comparing to the FIG. 4C, the working mold 440 has the same shape with the metal mold 410B.

Figure 4F:
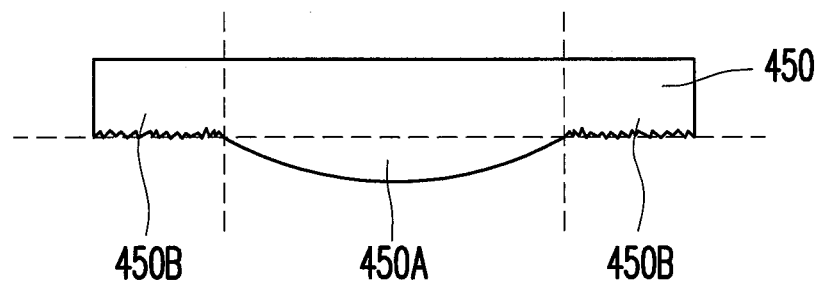

In FIG. 4F, an aspheric lens 450 is molded by the working mold 440 with two portions. The lens portion 450A shaped by the surface Sw is transparent and capable to be the light path. In contrast, the carry portion 450B shaped by the rough surface Swr is a matte surface.

In summary, according to the exemplary embodiments of the invention, the first lens group includes the aperture stop and the infrared filter which are optionally disposed on the surfaces of the transparent flat lens to form a complex optical element. Therefore, the micro-lens module including complex optical elements with good imaging quality has been miniaturized. Furthermore, the lenses of the micro-lens module each have a lens portion and a carry portion, and the surface of the carry portion is designed as a matte surface to reduce stray light.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A micro-lens module, adapted for an image processing device, the micro-lens module comprising:
   a first lens group disposed between an object side and an image side, wherein a surface closest to the object side in the first lens group is a first aspheric surface, and a surface closest to the image side in the first lens group is a second aspheric surface; and
   a second lens group disposed between the first lens group and the image side, wherein a surface closest to the first lens group in the second lens group is a third aspheric surface, and a surface closest to the image side in the second lens group is a fourth aspheric surface,
   wherein an overall length of the micro-lens module is L, an effective focal length (EFL) of the micro-lens module is f, an EFL of the second lens group is f2, and the micro-lens module satisfies following conditions: $1.5>L/f>0.6$, and $-7>f2/f>-14$, and a radius of curvature of the first aspheric surface is r1, a radius of curvature of the second aspheric surface is r2, a radius of curvature of the third aspheric surface is r3, a radius of curvature of the fourth aspheric surface is r4, and the micro-lens module satisfies following conditions: $r1>0$, $r2>0$, $r3>0$, and $r4>0$.

2. The micro-lens module as claimed in claim 1, wherein a distance between the first aspheric surface and the second aspheric surface is L1, a distance between the third aspheric surface and the fourth aspheric surface is L2, and the micro-lens module satisfies $1.3>L1/L2>0.8$.

3. The micro-lens module as claimed in claim 1, wherein the image processing device is disposed at the image side, a distance between the second aspheric surface and the third aspheric surface is T1, a distance between the fourth aspheric surface and a surface of the image processing device is BFL, and the micro-lens module satisfies $0.7>T1/BFL>0.4$.

4. The micro-lens module as claimed in claim 1, wherein the first lens group comprises a first lens and a second lens arranged in sequence from the object side to the image side, the first lens is closest to the object side in the first lens group, a surface of the first lens facing the object side is the first aspheric surface, the second lens is closest to the second lens group in the first lens group, and a surface of the second lens facing the image side is the second aspheric surface.

5. The micro-lens module as claimed in claim 4, wherein reflective indexes of the first lens and the second lens are respectively n1 and n2, the first lens satisfies 1.61>n1>1.56, and the second lens satisfies 1.55>n2>1.5.

6. The micro-lens module as claimed in claim 4, wherein the first lens group further comprises a first transparent flat lens.

7. The micro-lens module as claimed in claim 6, wherein the first lens group further comprises an aperture stop.

8. The micro-lens module as claimed in claim 7, wherein the aperture stop is disposed on a surface of the transparent flat lens facing the object side.

9. The micro-lens module as claimed in claim 4, wherein the first lens group further comprises an infrared filter disposed on a surface of the first transparent flat lens.

10. The micro-lens module as claimed in claim 4, wherein the first lens comprises a lens portion and a carry portion integrally formed, a surface of the carry portion of the first lens facing the object side is a matte surface.

11. The micro-lens module as claimed in claim 4, wherein the second lens comprises a lens portion and a carry portion integrally formed, a surface of the carry portion of the second lens facing the image side is a matte surface.

12. The micro-lens module as claimed in claim 1, wherein the second lens group comprises a third lens and a fourth lens arranged in sequence from the first lens group to the image side, the third lens is closest to the first lens group in the second lens group, a surface of the third lens facing the first lens group is the third aspheric surface, the fourth lens is closest to the image side in the second lens group, and a surface of the fourth lens facing the image side is the fourth aspheric surface.

13. The micro-lens module as claimed in claim 12, wherein reflective indexes of the third lens and the fourth lens are respectively n3 and n4, the third lens satisfies 1.55>n3>1.5, and the fourth lens satisfies 1.61>n4>1.56.

14. The micro-lens module as claimed in claim 12, wherein the second lens group further comprises a second transparent flat lens.

15. The micro-lens module as claimed in claim 12, wherein the third lens comprises a lens portion and a carry portion integrally formed, a surface of the carry portion of the third lens facing the object side is a matte surface.

16. The micro-lens module as claimed in claim 12, wherein the fourth lens comprises a lens portion and a carry portion integrally formed, a surface of the carry portion of the fourth lens facing the image side is a matte surface.

* * * * *